United States Patent [19]

Shimura et al.

[11] Patent Number: 4,652,937
[45] Date of Patent: Mar. 24, 1987

[54] FACSIMILE DEVICE

[75] Inventors: Masatoshi Shimura, Mishima; Kunio Yokoyama; Kuniaki Anbo, both of Yokohama; Kazuhiro Anzai, Yokosuka, all of Japan

[73] Assignee: Kabushiki Kaisha Toshiba, Kawasaki, Japan

[21] Appl. No.: 845,127

[22] Filed: Mar. 27, 1986

[30] Foreign Application Priority Data

Mar. 30, 1985 [JP] Japan .................................. 60-66965

[51] Int. Cl.$^4$ .............................................. H04N 1/14
[52] U.S. Cl. ................................... 358/286; 358/256; 358/293; 358/294
[58] Field of Search ............... 358/256, 285, 286, 293, 358/294

[56] References Cited

U.S. PATENT DOCUMENTS

| 3,541,248 | 11/1970 | Young | 358/294 |
| 3,739,095 | 6/1973 | Alden | 358/294 |
| 3,993,865 | 11/1976 | Brown et al. | 358/256 |
| 4,547,810 | 10/1985 | Rutherford et al. | 358/256 |

FOREIGN PATENT DOCUMENTS

| 56315 | 5/1979 | Japan | 358/285 |
| 9463 | 1/1983 | Japan | 358/256 |
| 59-138164 | 8/1984 | Japan | |
| 59-63873 | 11/1984 | Japan | |
| 123151 | 7/1985 | Japan | 358/256 |

Primary Examiner—Ronald C. Capossela
Attorney, Agent, or Firm—Cushman, Darby & Cushman

[57] ABSTRACT

A facsimile device includes an image pick-up means for picking up an image on an original moving relative to the image pick-up means, a transmitting means for appropriately processing the image signal from the image pick-up means into a modulated signal suitable for signal transmission, a coupling means for coupling the transmitting means with a transmitting system to provide a path for the modulated signal therebetween, and an original transfer means for transferring the original. The image pick-up means and the transmitting means are respectively provided with first and second cases so that the image pick-up means is slidable on an original such as a book. The second case may be placed on the first case. The coupling means is removably coupled with either of the transmitting means and the transmitting system. The original transfer means transfers the original between the first and second cases while the first case is placed on the second case.

8 Claims, 21 Drawing Figures

FACSIMILE DEVICE

BACKGROUND OF THE INVENTION

This invention relates to a facsimile device, and more particularly to a facsimile device which has an image reader and a transmitter, both being provided independent of a receiver of the facsimile device, and is handy and allows its vertical scanning to be done manually or automatically.

As well known, in a facsimile system, an image on a document is picked up in a transmitting side. An image signal representing the image information picked up is appropriately modulated. The modulated image signal is transmitted through a transmitting system (usually a telephone line) to a receiving side. In the receiving side, the received image signal is demodulated, and printed out in the form of a hard copy. The general facsimile device has both transmitting and receiving functions. The progress of the IC technology remarkably reduces the size of the facsimile device, to realize a compact facsimile device of the desk top type. However, the facsimile device of the portable type has not been matured from a view point of practical use.

There is an example of the facsimile device of the portable type in which a drum is used for picking up and recording the image. In this device, for picking up the image in the transmitting side, a document sheet is wound around the drum and the drum is rotated. In the receiving side, a recording paper is wound around the drum, and the drum is rotated for image printing. During this rotation of the drum, a stylus electrode is selectively discharged to destroy the conductive surface of the paper to print the transmitted image on the paper. This type of the facsimile device is suitable for picking up an image on a sheet like paper, but is incapable of picking up the image on an original which can not be wound around the drum, such as notebooks, books, and newspaper. The portable facsimile device requires troublesome work to wind a document and a recording sheet around the drum. This hinders a speedy facsimile transmission.

Japanese Patent Disclosure (Kokai) Nos. 59-63873 and 59-138164 disclose each an image reader capable of reading in an image on notebooks, books, newspaper, and the like, which were rejected in use by the above-mentioned portable facsimile device. The disclosed device is provided with a scanner in which the vertical scanning can manually been done, that is, the scanner can be moved on the document. The image information collected by the scanner are stored into an image memory. The scanner is provided with a rotary encoder for detecting a vertical scanning rate, viz. a moving speed of the scanner relative to the document. Pulses generated by the encoder are used for controlling the image data transfer to the image memory.

The image reader of this type is suitable for reading in the image on a document such as books, but is not suitable for reading in the image of a sheet like document. The reason for this is that since for image reading, the scanner is moved on the sheet like document, the document is frequently moved or wrinkles.

The image reader as disclosed in the above Kokai has another problem. When the scanner is slid on the document at a high speed above a predetermined one, it improperly reads in the image. Such improper image data are stored in the memory, and transmitted to the receiving side.

SUMMARY OF THE INVENTION

An object of the present invention is to provide a facsimile device adaptable for any type of document for image reading.

Another object of this invention is to provide a facsimile device allowing the transmission of image data picked up at only a proper speed of manual subscanning.

The first object of this invention can be achieved by a facsimile device comprising:

means with a first case for picking up an image on an original moving relative to and under said first case;

transmitting means with a second case allowing said first case to be placed thereon, said transmitting means receiving an image signal transmitted from said image pick-up means and appropriately processing the image signal into a modulated signal suitable for signal transmission;

means for coupling said transmitting means with a transmitting system to provide a path for said modulated signal therebetween, said coupling means removably coupled with said transmitting system; and means for transferring the original between said first and second cases, while said first case being placed on said second case.

The second object of this invention is achieved by further comprising means provided in said first case, and for detecting a moving speed of said image pick-up means relative to the original; and checking means for checking if a relative moving speed of said image pick-up means as detected by said speed detecting means is within a tolerable speed, and when the detected speed is within the tolerable speed, allows the image signal from said image pick-up means to be transmitted in the form of the modulated image signal by said transmitting means.

With such an arrangement, for picking up an image on an ordinary document such as a sheet like document, the image reader is placed on the transmitter. Under this condition, the document is transferred and the image data are collected in an automatic subscanning mode. For picking up an image on a document such as a book, the image reader is manually moved, while removed from the transmitter. The image reading is performed in a manual scanning mode.

The image data thus read in is sent from the image reader through a cable to the transmitter. Then, it is modulated by the transmitter, and output to a transmitting system through the coupling means.

DETAILED DESCRIPTION OF THE PREFERRED EMBODIMENTS

Figure 1:
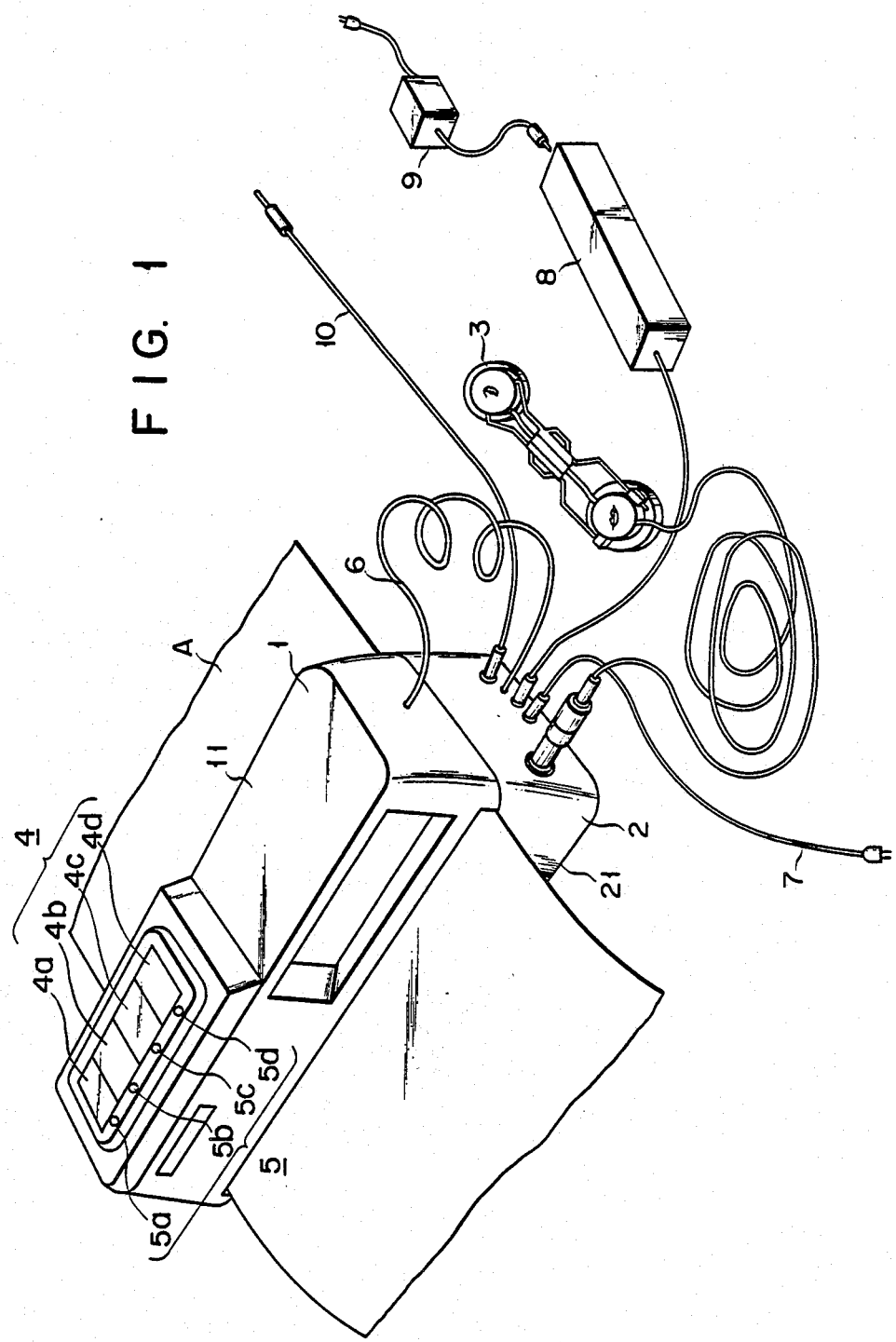
FIG. 1 is a diagram illustrating a facsimile device according to this invention when it reads in an image on a sheet like document.
Figure 2:
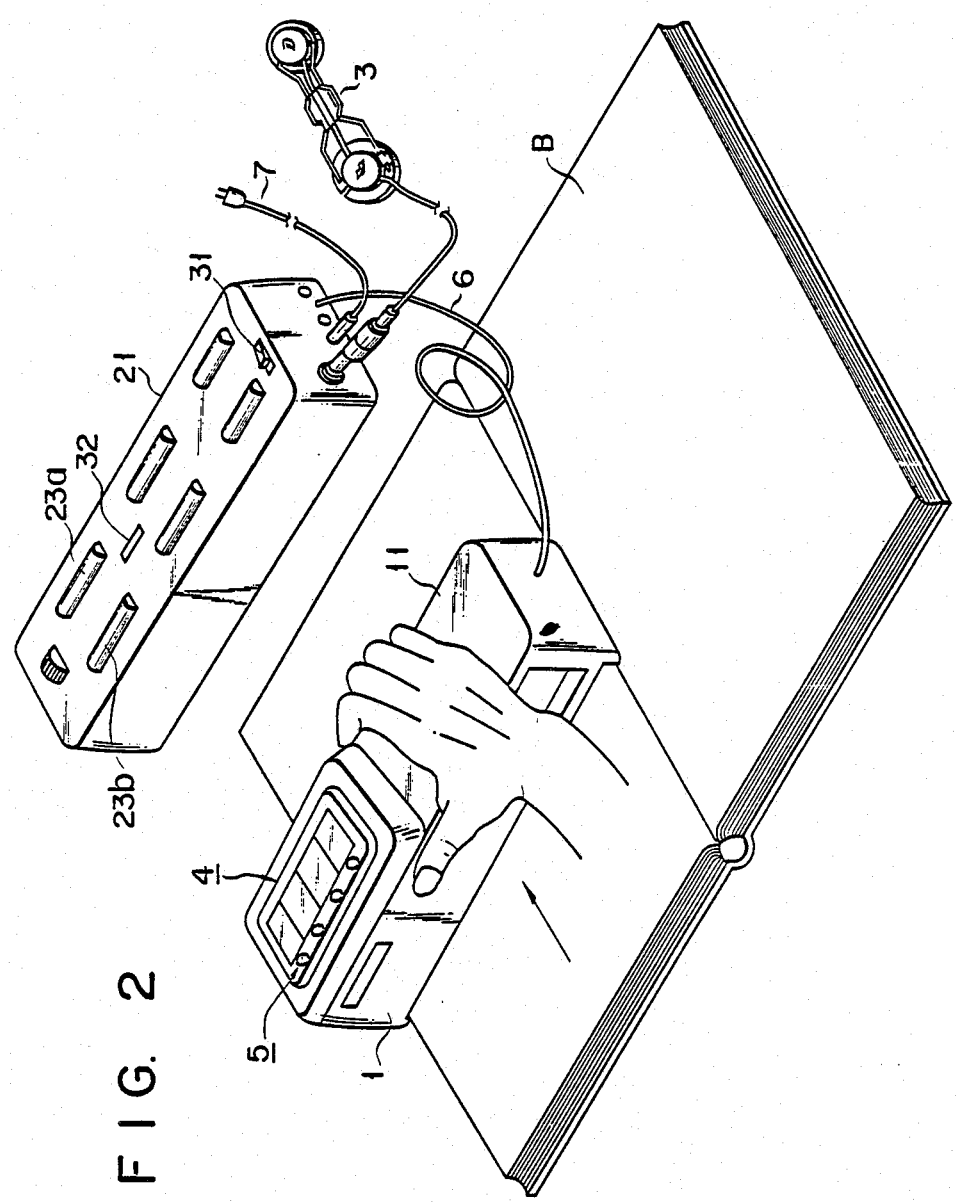
FIG. 2 is a diagram illustrating the facsimile device of this invention when it reads in an image on a book.

Referring to FIGS. 1 and 2, there are illustrated a facsimile device according to an embodiment of the present invention. FIG. 1 illustrates how to read in an image on a sheet like document A, and FIG. 2 illustrates how to read in an image on a book B.

As seen from FIGS. 1 and 2, the facsimile device is comprised of an image reader 1, transmitter 2, acoustic coupler 3 for coupling the transmitter with a transmission system, and a paper transfer mechanism. Image reader 1 is comprised of operating section 4 including power button 4a, read button 4a, transmission button 4c, and reset button 4d, and indicating section 5 including indicating lamps 5a to 5d provided corresponding to the buttons 4a to 4d. Image reader 1 and transmitter 2 are electrically connected to each other by cable 6, which is removably coupled with them. This cable 6 is used for the power supply from transmitter 2 to image reader 1, the control of image reader 1 by transmitter 2, and transfer an image signal from image reader 1 to transmitter 2. For easy carry of the device, battery pack 8 of secondary battery such as a NiCd battery is provided for a power supply, in addition to AC cord 7. The cord and battery pack are removably set to transmitter 2. Charger 9 is provided from charging battery pack 8. The output signal from transmitter 2 is supplied through cable 10 to a receiver to be given later. Cable 10 is disconnectedly coupled with both the transmitter and receiver.

Figure 3:
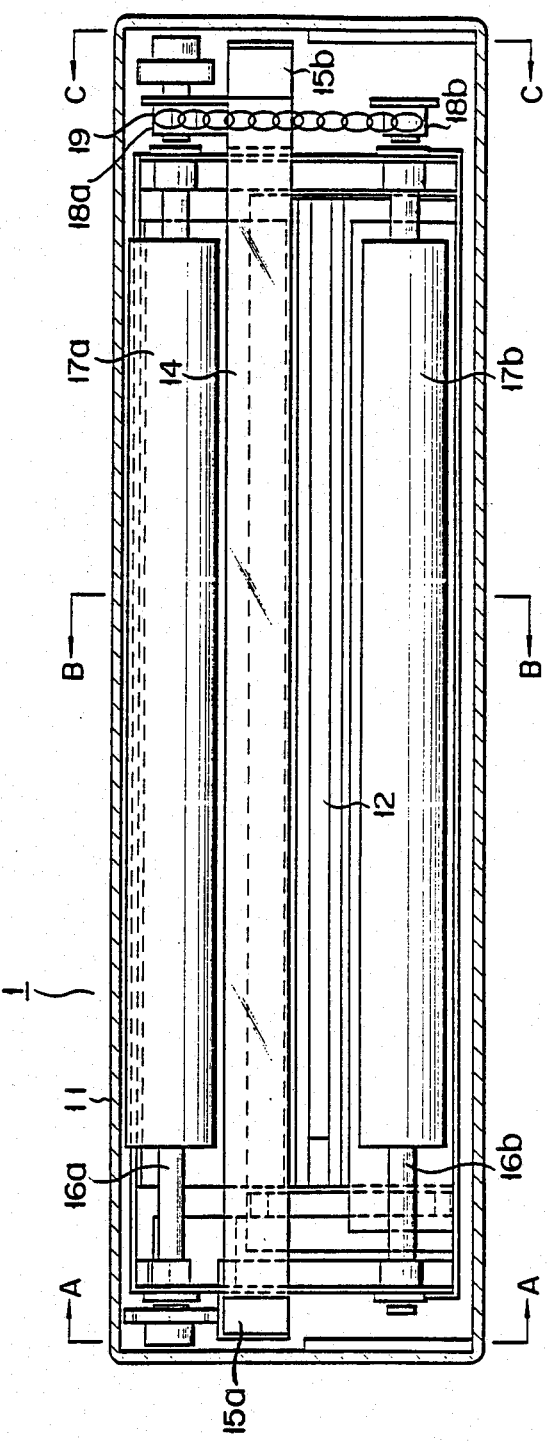
FIG. 3 shows a horizontal sectional view of an image reader as viewed from the bottom thereof.
Figure 4:
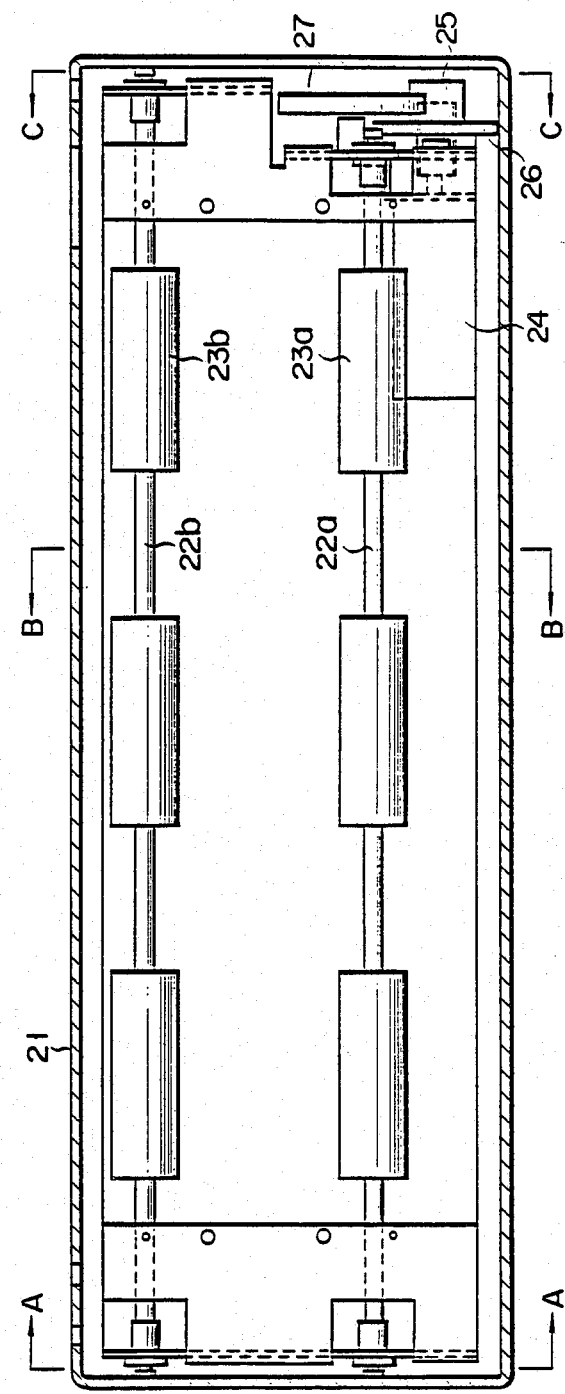
FIG. 4 shows a horizontal sectional view of a transmitter used in the facsimile device of this invention.
Figure 5:
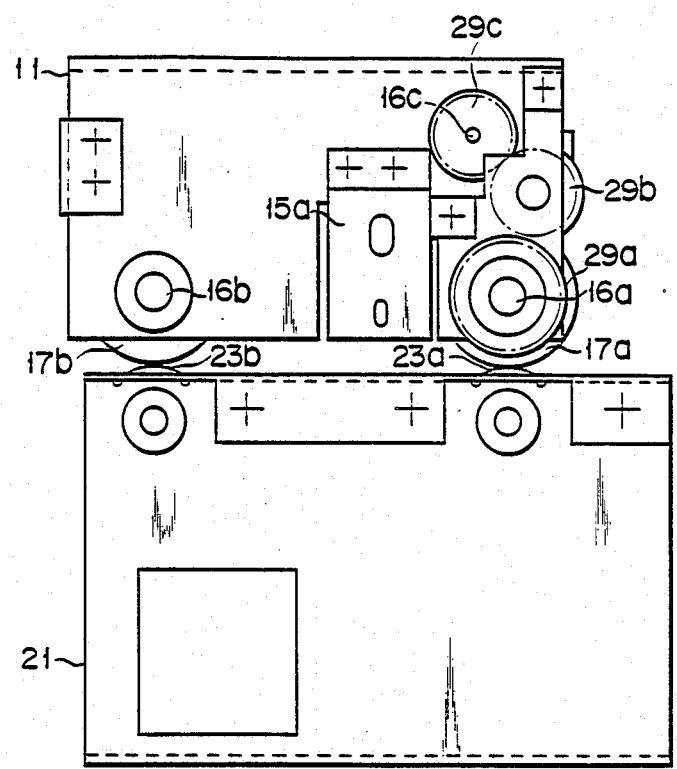
FIG. 5 shows a cross sectional view of the image reader and the transmitter when these are placed one on another, the view being taken on line A—A and viewed in the arrow head direction.
Figure 6:
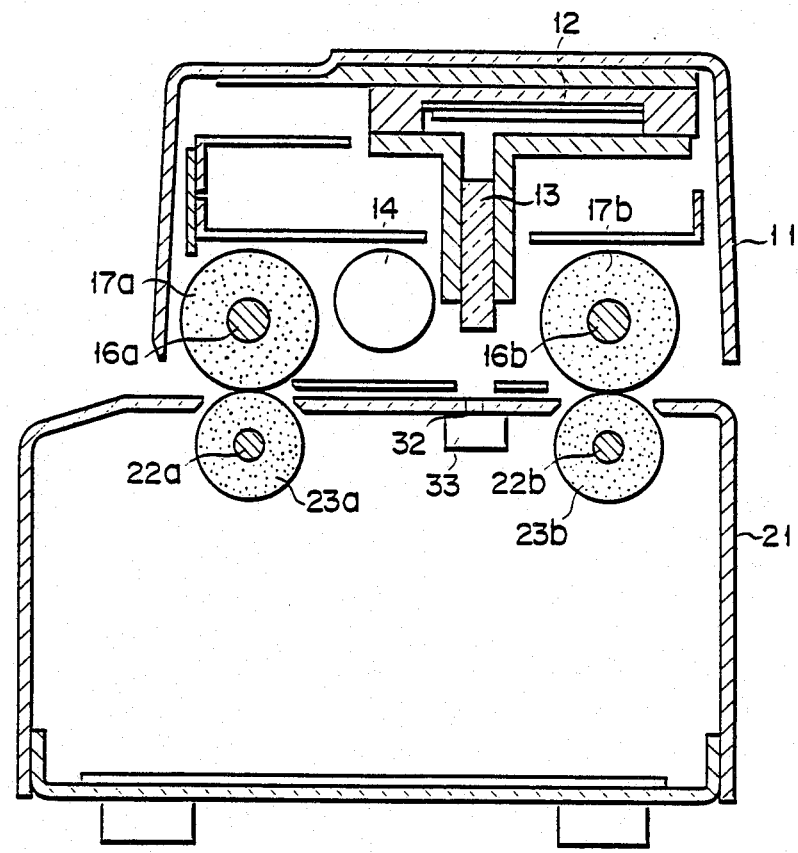
FIG. 6 shows a cross sectional view of the same as taken on line B—B and viewed in the arrow head direction.
Figure 7:
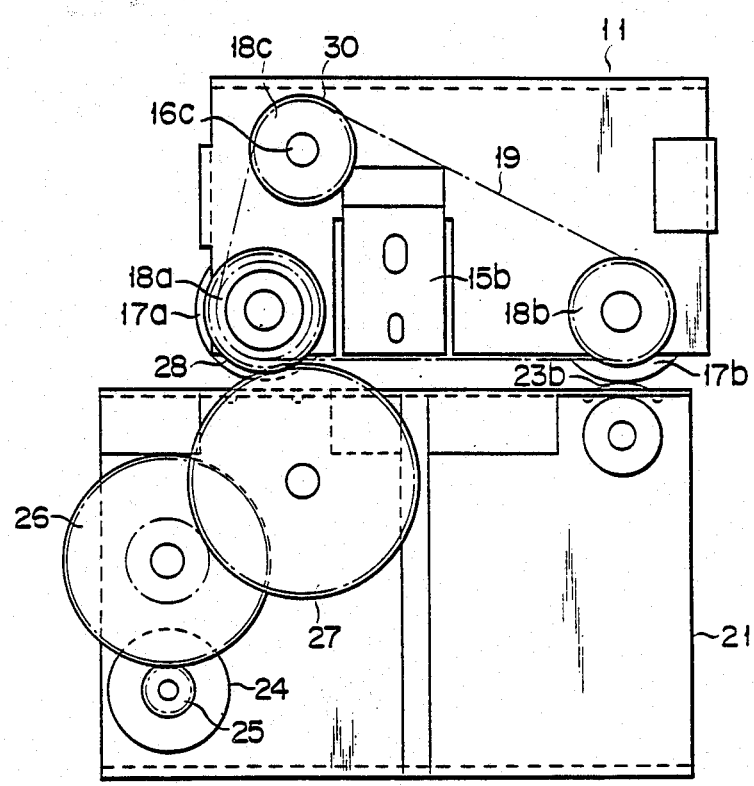
FIG. 7 shows a cross sectional view of the same as taken on line C—C and viewed in the arrow head direction.

Image reader 1, transmitter 2 and the paper transfer mechanism will be given in detail. FIG. 3 shows a horizontal sectional view illustrating the structure of image reader 1; FIG. 4 a horizontal sectional view illustrating the structure of transmitter 2; FIG. 5 a cross sectional view of the image reader 1 and transmitter 2 when these are placed one upon the other, as shown in FIG. 1, and taken on line A—A and viewed in the arrow head direction; FIG. 6 a cross sectional view of the same as taken on line B—B and in the arrow head direction; and FIG. 7 a cross sectional view of the same as taken on line C—C and in the arrow head direction.

As seen from FIG. 3, and FIGS. 5 to 7, image reader 1 has a first case 11 partially opened at the lower side. Image sensor 12 is disposed in the upper part of the inside of case 11. Array 13 of rod lenses (distributed index lenses) called SELFOC lens (trade name) is disposed under image sensor 12. In image sensor 12, photoelectronic elements made of amorphous silicon are arrayed in a line. This type of the image sensor is a one-dimensional image sensor called a close contact type image sensor. The length of the array is equal to the width of a document with, for example, A4 size. Lens array 13 image the pictorial image on the document at one-to-one ratio on image sensor 12. Fluorescent lamp 14, as a light source for illuminating the document surface, is located in the vicinity of the light emitting end of rod lens array 13 inside first case 11. Lamp 14 is oriented in parallel with the direction of the array of photoelectronic elements of image sensor 12. The lamp 14 is set to a pair of sockets 15a and 15b.

A couple of shafts 16a and 16b, which are spaced at a predetermined distance, are provided in parallel with sensor 12, lens array 13, and lamp 14. Motive rollers 17a and 17b for transferring the document are fixedly mounted around these shafts 16a and 16b, respectively, while their outer surfaces slightly project from first case 11 through openings. Rotary encoder 30, fixed to shaft 16c, serves as a means for detecting a speed of image reader 1 relative to the document. Mounted at the ends of shafts 16a to 16c are ladder wheels 18a to 18c, which are wound by ladder chain 19.

Transmitter 2 is provided with second case 21, which is different from the first case 11 of image reader 1, as shown in FIGS. 4, and 5 to 7. Provided in second case 21 are shafts 22a and 22b being located in opposition to shafts 16a and 16b in first case 11. Follower rollers 23a and 23b are fixed to these shafts 22a and 22b. The follower rollers 23a and 23b contain each a plurality of rollers equidistantly arranged around the shafts 22a and 22b. Motor 24 as a rotating motive source to transfer the document is disposed in second case 21. The rotating force is transmitted through a chain of gears 24 to 26 to a gear 28, which is coupled with the shaft of the roller 17a in first case 21. Gear 25 is directly coupled with the shaft of motor 24. Gear 29a is coupled with the shaft of motive roller 17a on the opposite side of gear 28. Rotating force is transmitted from this gear 29a through gears 29b and 29c to the shaft 16c supporting rotary encoder 30.

As shown in FIG. 2, switch 31 is provided at the end on the surface of second case 21. This switch is operated when second case 11 is placed on second case 21, and serves as a vertical scanning mode detector for detecting if the vertical scanning is done manually or automatically. Operation of this switch indicates an automatic vertical scanning, while nonoperation a manual vertical scanning.

Provided within second case 21 is paper sensor 33 for detecting presence or absence of the document, as shown in FIG. 6. Sensor 33 is constructed with combination of a light emitting element and a photo sensing element. The light emitting element emits light rays upwardly through slit 32 at the upper part of second case 21, while the photo sensing senses reflected rays of light for the document presence detection. A paper sensor uses transmitted light for its detection, in place of the reflected light.

For reading in the image on sheet like document A, the first case 11 of image reader 21 is placed on the second case 21 of transmitter 2, with the opening of first case 11 directed downwardly, as shown in FIGS. 1 and 5 to 7. Under this condition, document A is nipped at one end between the motive rollers 17a and 17b of image reader 1 and the follower rollers 23a and 23b of transmitter 2. Power button 4a and read button 4b are pushed. Signals from these buttons are fed through cable 6 to motor 24. Rotating force generated by motor 24 is transmitted through gear chains 25 to 26 and 27 to 28 to transfer roller 17a, and through a path of ladder chain 19 and ladder wheels 18a, 18c and 18b to rollers 17a and 17b. Document A is transferred being nipped between motive rollers 17a and 17b and follower rollers 23a and 23b. Fluorescent lamp 14 is also lit to illuminate the surface of document A. Image on document A is imaged on image sensor 12 through rod lens array 13. The sensor 12 reads the image and outputs it as an image signal. The image signal is sent to transmitter 2 through cable 6.

For reading in an image on book B, image reader 1 is removed from transmitter 2, and manually slid on the sheet in desired page of the book in the direction of arrow, for example.

Figure 8:
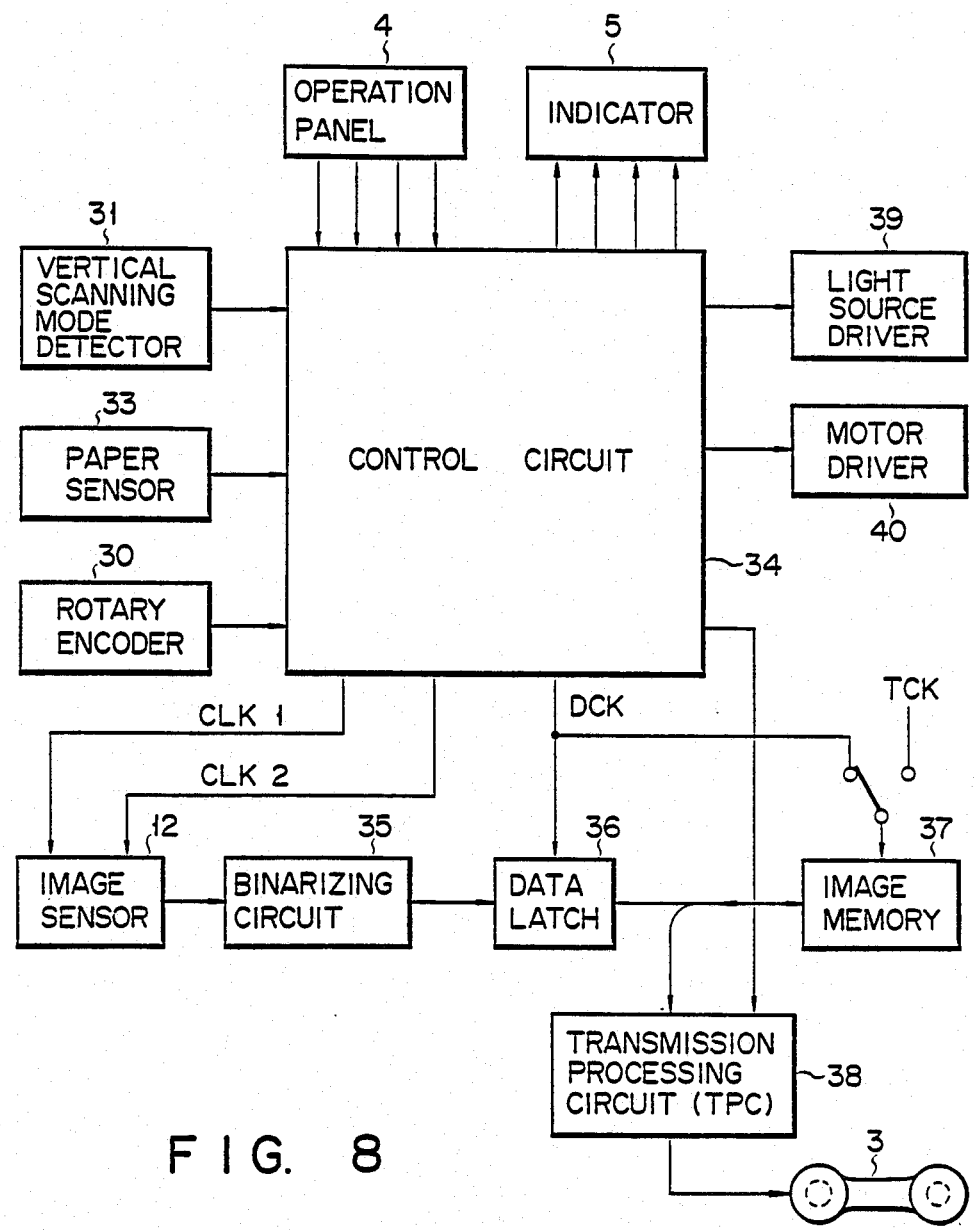
FIG. 8 is a block diagram of an electronic circuit section of the facsimile device.

Turning now to FIG. 8, there is in block form shown a circuit arrangement of image reader 1 and transmitter 2. In FIG. 8, the image sensor 12 in image reader 1 operates in response to first and second clock signals CLK1 and CLK2 derived from control circuit 34, and serially produces an image signal. The image signal from image sensor 12 is normalized into a binary signal of 1 or 0 by binarizing circuit 35, and then fed to data latch 36. Latch circuit 36 samples and latches the binary image signal by clock signal DCK with the same rate as that of second clock signal CLK1, which is supplied from control circuit 34. The image signal from data latch 36 is stored into image memory 37 while being timed by clock signal DCK.

The image signal stored in memory 37 is read out by clock signal TCK of frequency depending on a transmitting rate, and fed to transmission processing circuit (TPC) 38. As in the ordinary facsimile device, TPC 38 applies to the image signal as input an appropriate signal processing such as data compression encoding, and modulates it into a signal suitable for its transmission, such as a phase modulated signal or a quadrature amplitude modulated signal. The modulated signal is appropriately amplified and sent to acoustic coupler 3.

Acoustic coupler 3, set to a telephone set (not shown), converts the modulated signal from TPC 38 into an acoustic signal. The acoustic signal is then sent through the telephone set to the telephone line (usually public telephone line), and to the facsimile device of the opposite party.

Further connected to control circuit 34 are operating section 4, indicating section 5, rotary encoder 30, vertical scanning mode detector 31, paper sensor 33, light source driver 39, and motor driver 40. Drivers 39 and 40 drive light source 14 and motor 24, respectively.

Figure 9:
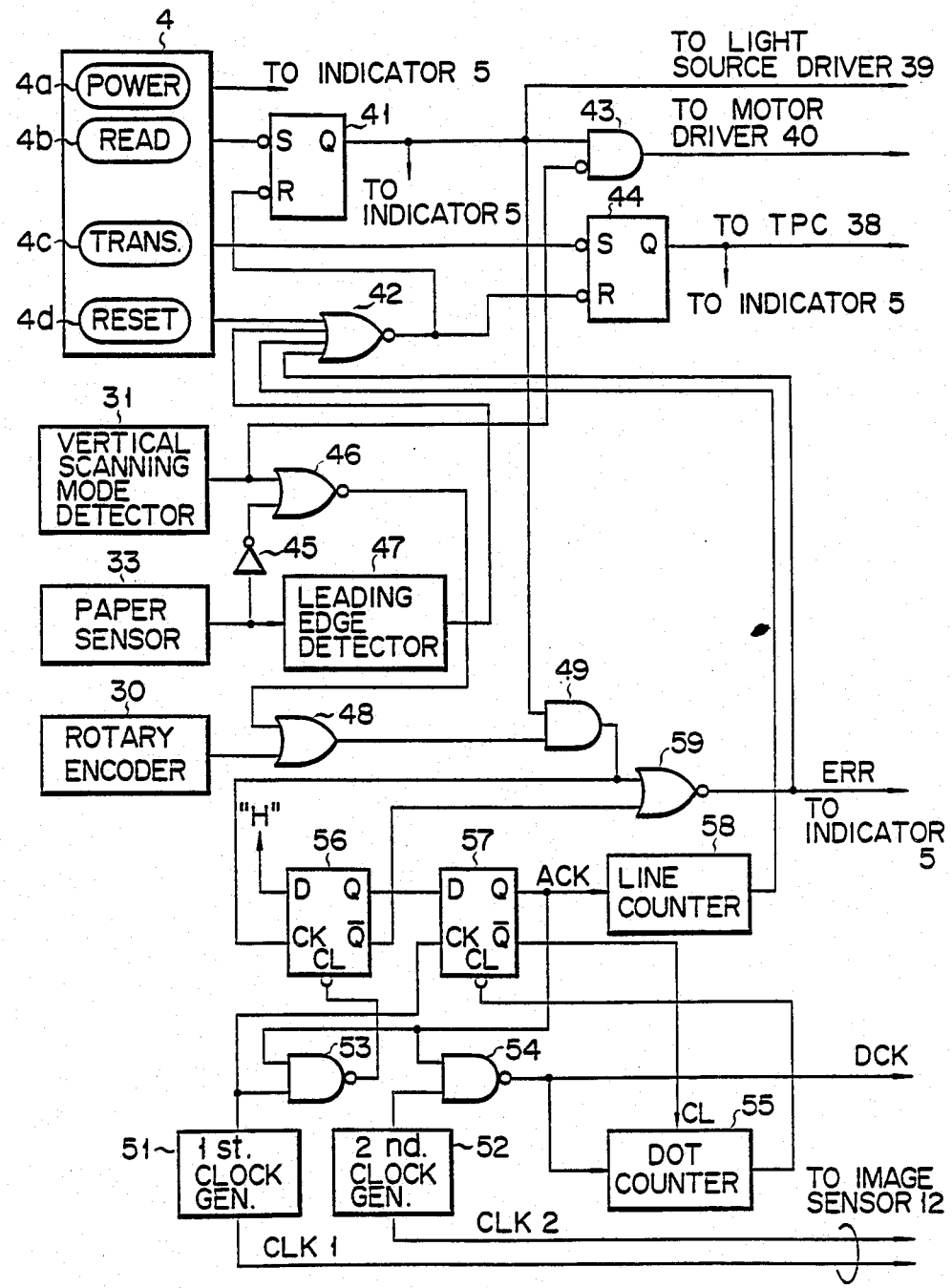
FIG. 9 is a circuit diagram of a control circuit of FIG. 8.
Figure 10:
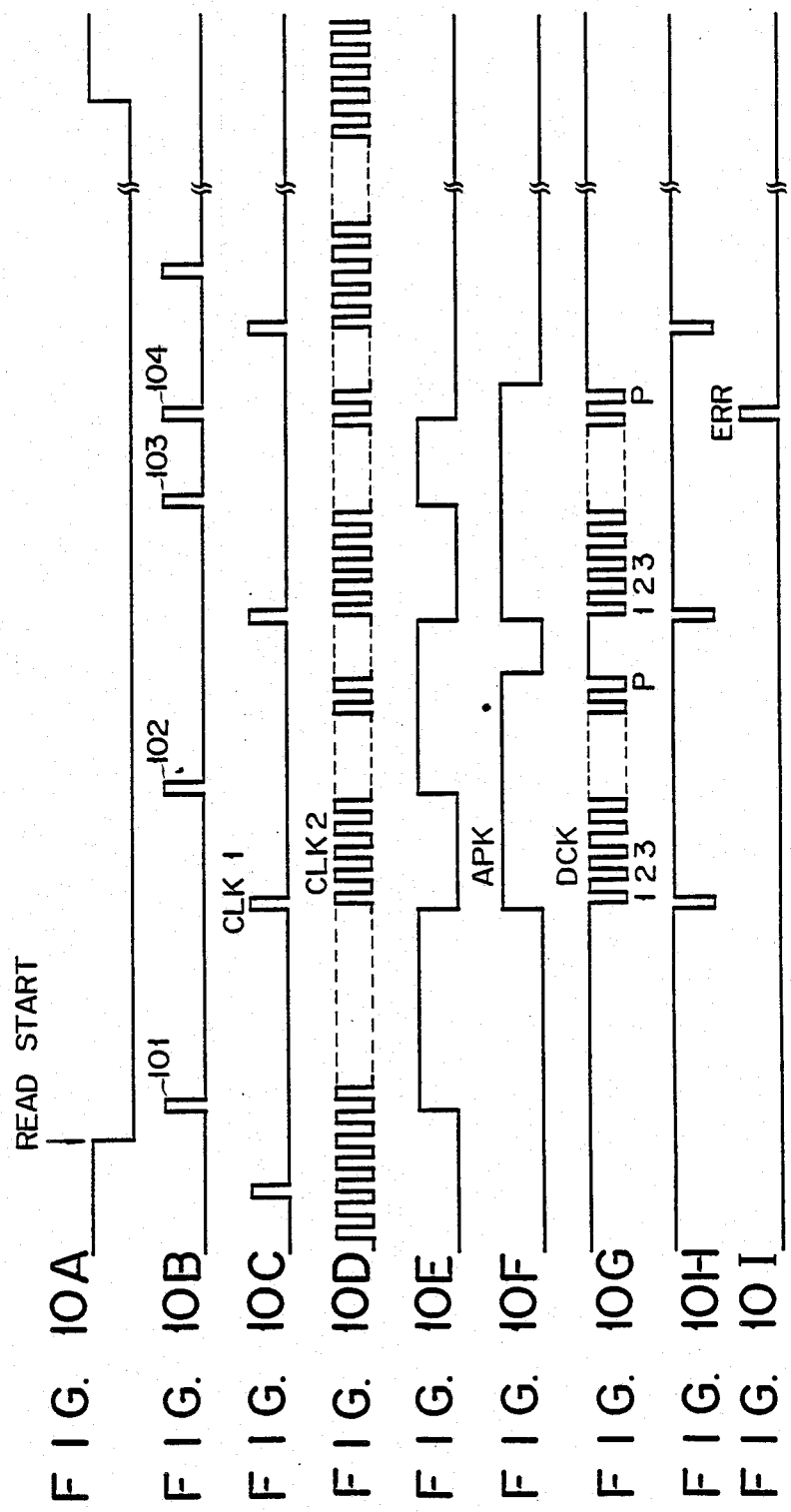
FIGS. 10A–10I show a set of waveforms useful in explaining the operation of the FIG. 9 circuit.

A detailed arrangement of control circuit 34 is shown in FIG. 9 and a timing chart describing its operation in FIG. 10. In FIG. 9, R-S flip-flop 41 is set by a read start signal derived from button 4b, and reset by the output of NOR gate 42. When set, it produces Q output signal as shown in FIG. 10A. The signal causes light source driver 39 to operate. Motor driver 40 is operated by the output signal of AND gate 43 when flip-flop 41 is set when the output of vertical scanning mode detector 31 is low in logical level, viz. in the automatic vertical scanning mode.

R-S flip-flop (FF) 44 is set by a transmit start signal from button 4c, and is reset by the output signal from NOR gate 42. NOR gate 42 receives at the first input terminal a reset signal from reset button 4d. The reset signal from reset button 4d may be used for the reset input of FF 44. The Q output of FF 44 is supplied to TPC 38 in FIG. 8. During the period of time that the Q signal is high in logical level, image data transmission is performed.

Paper sensor 33 produces a low level signal when document is detected, and a high level signal when it is not detected. The output signal of detector 33 is applied to inverter 45 and leading edge detector 47. Detector 47 applies its output to the second input terminal of NOR gate 42. The output signals of inverter 45 and detector 31 are coupled with the input of NOR gate 46. The outputs of NOR gate 46 and encoder 30 are fed to NOR gate 48. The output signals of NOR gate 48 and FF 41 are applied to AND gate 49.

Clock generators 51 and 52 generate first and second clock signals CLK1 and CLK2 with frequencies f1 and f2 corresponding to standard rates of vertical and horizontal scannings. Reference is made to FIGS. 10C and 10D. The number of read-in picture elements (the number of photoelectronic elements of image sensor 12) per horizontal scanning line is P, the frequencies f1 and f2 are selected so as to satisfy the following relation $$f2 \geq P \times f1$$

In this instant, P=1728, for example. Clock signals CLK1 and CLK2 are applied to image sensor 12 and to the first input terminals of NAND gates 53 and 54. The output signal of NAND gate 53 as shown in FIG. 10 is applied to the clear terminal (CL) of first D-FF 56. The output signal of NAND gate 54 serves as the clock signal DCK shown in FIG. 10G, and is input to the clock input of dot counter 55, and further to data latch 36 and image memory 37 shown in FIG. 8.

Dot counter 55 produces a pulse signal when it counts the clock signal DCK by P. The pulse signal from dot counter 55 is input to the clear input terminal of second D-FF 57. The Q output shown in FIG. 10E of FF 56 is input to the D input of FF 57. Its clock input terminal (CK) is supplied with first clock signal CLK1. The Q output (clock signal ACK) of FF 57 shown in FIG. 10F is input to the clock input of line counter 58, and the number of clock signal ACK, i.e. the number of horizontal scanning lines as read in by image reader, is counted by this counter. The $\overline{Q}$ output of FF 57 is input the clear input (CL) of line counter 58.

Line counter 58 produces a pulse signal when its count reaches the number of horizontal scanning lines N (=1200) corresponding to the width of the A4 document. The output signal from this line counter 58 is input to the third input terminal of NOR gate 42.

FF 56 is kept at the D input in high (H) level. The pulse signal from rotary encoder 30, as shown in FIG. 10B, is applied to the clock input (CK) by way of NOR gate 48 and AND gate 49. When receiving at the clear input (CL) the output signal of NAND gate 53 shown in FIG. 10H, it produces at the Q output the signal shown in FIG. 10E. The $\overline{Q}$ output of FF 56 and the output of AND gate 49 are input to NOR gate 59. An output waveform of NOR gate 59 is as shown in FIG. 10J.

The manual vertical scanning operation follows. When the moving speed of image reader 1 (vertical scanning speed) relative to the document is within a tolerable speed, encoder 30 produces pulse signals at periods longer than the period of first clock signal CLK1, as indicated by reference numerals 101, 102 and 103. As shown in FIG. 10E, the Q output signal of FF 56 goes high every time pulse signals 101 to 103 are produced from encoder 30, and is cleared by the output signal of NAND gate 53 every time one shot of first clock pulse CKL1 is generated, and the Q output signal goes low. At the timing of the clock signal CLK1, the Q output signal of FF 56 is high in level, and then the Q output of FF 57 goes high. Therefore, the clock signal CKL2 from clock signal generator 52 goes through NAND gate 54 and acts as the clock signal DCK. This signal DCK is counted by dot counter 55. When counter 55 counts a necessary number (P) of the pulses, it produces a pulse signal to clear FF 57. Following the clearing of FF 57, the $\overline{Q}$ output of FF 57 clears the counter 55 itself. By the clock signal DCK of P thus obtained, the image signal from sensor 12 is stored into image memory 37, by way of binarizing circuit 37 and data latch circuit 36. A sequence of these operations are continued till the number of horizontal scanning lines counted by counter 58 reaches a predetermined value.

If the speed of image reader 1 exceeds the tolerable speed, encoder 30 produces pulses at intervals shorter than the period of clock signal CLK1, as indicated by numeral 104 in FIG. 10B. Thus, during the period that the $\overline{Q}$ output of FF 56 is low, encoder 30 produces the pulse signal. The pulse signal from encoder 30 is applied to the first input of NOR gate 59, through NOR gate 48 and AND gate 49. The $\overline{Q}$ output of FF 56 is applied to the second input thereof. When the pulse signal 101 as described above is generated by encoder 30, the output of NOR gate 50 goes high, as shown in FIG. 10J, and is output as error detection signal ERR. Signal ERR is input the fourth input of NOR gate 42 to reset FF 41 and to stop light source driver 39. When FF 41 is reset, the output of AND gate 49 goes low. Therefore, FF 56 is cleared at the timing of first clock signal CLK1 as next generated and subsequently its Q output is kept in low level. FF 57 also keeps its Q output in low level when it is cleared by the output dot counter 55. Then, clock signal DCK stops, and the writing operation of the image signal to image memory 37 is stopped. Accordingly, the outputting of the image signal from transmitter 2 is finally stopped. The error signal ERR is also supplied to indicating section 5, so that section 5 indicates that the vertical scanning speed is too high.

In the automatic vertical scanning mode, the output signal of detector 31 goes low. Then, the output of AND gate 43 causes motor driver 40 to be in operation. Under this condition, if the document is set between image reader 1 and transmitter 2, the output of sensor 33 goes low and the output of inverter 45 goes high, so that the output of NOR gate 46 goes low. Accordingly, the pulse signal from encoder 30 is input to the clock input (CK) of FF 56 through AND gate 49. As a result, the clock signal DCK is generated as in the case of the manual vertical scanning, to execute the storage of the image signal into memory 37. In the automatic vertical scanning mode, the document is transferred at a fixed vertical scanning speed by motor 24, and hence the period of the pulse signal generated by encoder 30 is substantially equal to that of clock signal CLK1. For this reason, no error signal is generated although it is generated in the automatic vertical scanning mode. The reading operation of the image reader 1 ends when the end of the document is detected by sensor 33 or the number N of horizontal scanning lines counted by line counter 58 reaches the predetermined value.

Figure 11:
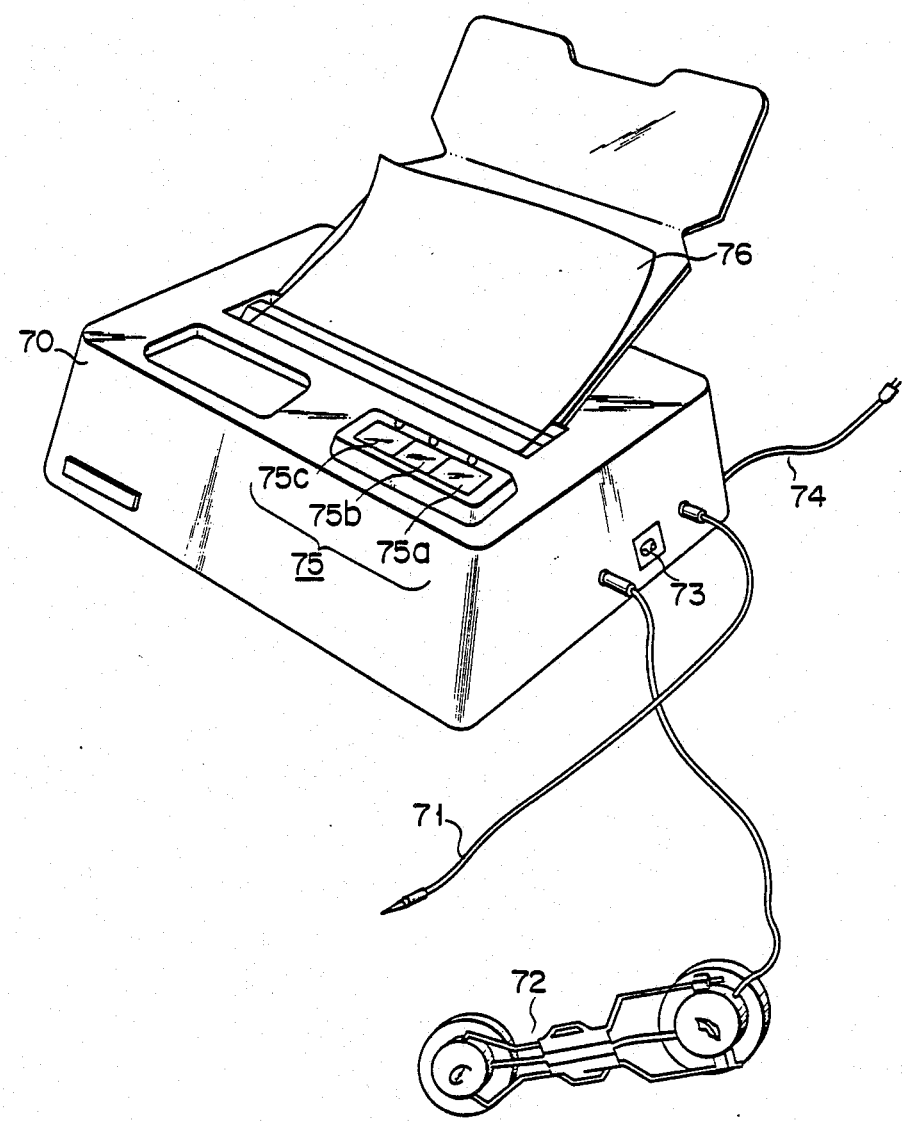
FIG. 11 shows an outlook view of of a receiver coupled with the facsimile device of this invention.

FIG. 11 shows an appearance of receiver 7, which is well combined in use with the facsimile device of this invention. In the figure, receiver 70 contains a thermal printer (recording section). Cable 71 like cable 10 is for connecting receiver 70 and transmitter 2. The cable is removably coupled with these. Receiver 70 may be connected to a telephone set by an acoustic coupler 72. Further, the device has a terminal 73 for connecting to the telephone line, as in the case of the conventional facsimile. An AC power code 74 is also used for a power supply means. Receiver 7 is constructed separately from image reader 1 and transmitter 2. Therefore, the facsimile device may be constructed compact and light in weight, and can easily be carried. The facsimile device may be driven by a battery.

An operating section 75 of receiver 70 is provided with power button 75a, receiving button 75b, and paper transfer button 75c. By connecting receiver 70 to transmitter 2 by cable 71 and appropriately operating section 75, the image picked up by reader 1 can be recorded on recording sheet 76 (heat sensitive sheet). The combination of image reader 1, transmitter 2 and receiver 70 is operable as a copy machine. Of course, the image signal from the facsimile may be sent through coupler 72 or the terminal 73 to the telephone line to the opposite facsimile device, as in the normal facsimile transmission. It can be operated as a printer for personal computers or word processors if the cable is combined with proper interface.

Figure 12:
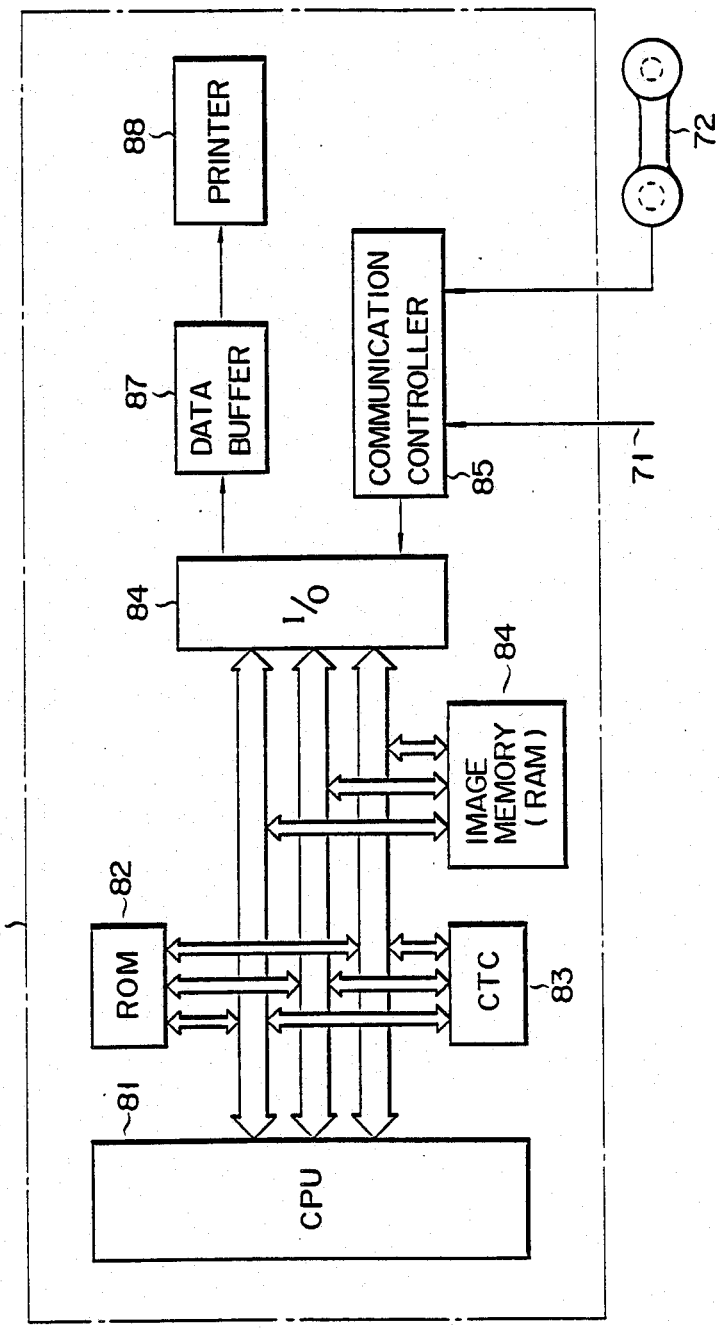
FIG. 12 is a block diagram of an electronic circuit of the FIG. 11 device.

FIG. 12 shows a circuit arrangement of receiver 70. It is comprised of a control section including CPU 81, ROM 82, counter/timer circuit (CTC) 83 and input-/output port 84, communication control section 85 containing a MODEM for demodulating the modulated signal coming through cable 71, coupler 72 or terminal 63 in FIG. 11, data butter 87 and thermal recorder 88.

Figure 13:
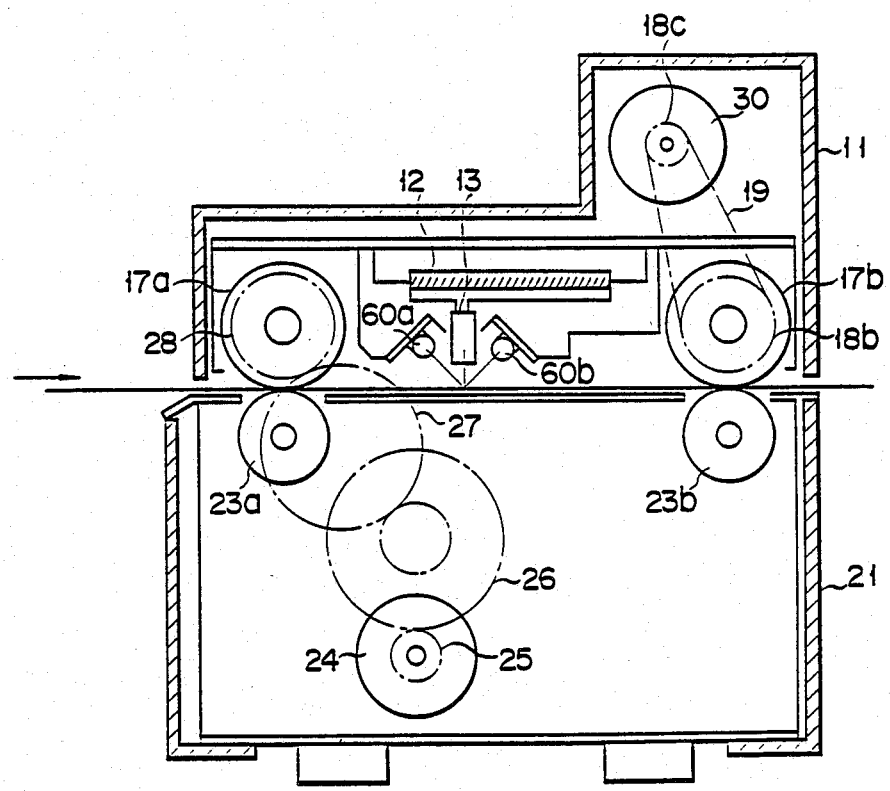
FIG. 13 shows a vertical sectional view of a facsimile device according to another embodiment of this invention.

FIG. 13 shows a cross sectional view of another embodiment of a facsimile device of this invention. This embodiment has substantially the same construction of the above-mentioned embodiment except that LED arrays 60a and 60b are used for a means for illuminating the document surface. Like reference symbols designate like portions in the previous embodiment of FIGS. 1 to 7.

It is evident that this invention is not limited to the above-mentioned embodiments, but may variously be changed and modified within the scope of this invention. The acoustic coupler may be contained in a telephone set. In this case, a cable is merely used for coupling the transmitter to the telephone set. Also in the case that the data as input in the form of an electrical signal is directly applied, by the telephone set, to the telephone line without any conversion to the sound signal, the coupling means is a mere cable for electrical signal transmission and connectors associated therewith. The coupling means, when the transmission system has telephone set at the terminal, may be such that the end of the transmission system is at least removable, lie the acoustic coupler, and fixed to the transmitter.

What is claimed is:
1. A facsimile device comprising:
   image pick-up means with a first case for picking up an image on an original moving relative to and under said first case;
   transmitting means with a second case allowing said first case to be placed thereon, said transmitting means receiving an image signal transmitted from said image pick-up means and appropriately processing the image signal into a modulated signal suitable for signal transmission;

coupling means for coupling said transmitting means with a transmitting system to provide a path for said modulated signal therebetween, said coupling means removably coupled with said transmitting system; and paper transfer means for transferring the original between said first and second cases, while said first case being placed on said second case.

2. A facsimile device according to claim 1, in which said transmission system contains a telephone line as a transmission path, and said coupling means includes an acoustic coupler for converting the received modulated signal into an acoustic signal and transmitting the acoustic signal to a telephone set.

3. A facsimile device according to claim 1, in which said coupling means is also removably coupled with said transmitting means.

4. A facsimile device according to claim 1, in which said paper transfer means is provided in said first case, and includes a motive roller in contact with the original, a rotary drive source provided in said second case, a rotation transmitting mechanism for transmitting a rotating force from said rotary drive source to said motive roller with said first case being placed on said second case, and a follower roller mounted to said second case and rotatable by the rotating force transmitted from said motive roller with said first case being placed on said second case, the original being transferred nipped between said motive roller and follower roller.

5. A facsimile device comprising:

image pick-up means with a first case for picking up an image on an original moving relative to and under said first case;

transmitting means with a second case allowing said first case to be placed thereon, said transmitting means receiving an image signal transmitted from said image pick-up means and appropriately processing the image signal into a modulated signal suitable for signal transmission;

coupling means for coupling said transmitting means with a transmitting system to provide a path for said modulated signal therebetween, said coupling means removably coupled with said transmitting system;

paper transfer means for transferring the original between said first and second cases, while said first case being placed on said second case;

speed detecting means provided in said first case, and for detecting a moving speed of said image pick-up means relative to the original; and checking means for checking if a relative moving speed of said image pick-up means as detected by said speed detecting means is within a tolerable speed, and when the detected speed is within the tolerable speed, allows the image signal from said image pick-up means to be transmitted in the form of the modulated image signal by said transmitting means.

6. A facsimile device according to claim 5, in which said paper transfer means is provided in said first case, and includes a drive roller in contact with the original, a rotary drive source provided in said second case, a rotation transmitting mechanism for transmitting a rotating force from said rotary drive source to said drive roller with said first case being placed on said second case, and a follower roller mounted to said second case and rotatable by the rotating force transmitted from said drive roller with said first case being placed on said second case, the original being transferred nipped between said drive roller and follower roller, said speed detecting means is a rotary encoder for generating a pulse every time the original moves a predetermined distance, said encoder being driven by a rotating force from said drive roller.

7. A facsimile device according to claim 5, in which said speed detecting means is a rotary encoder for generating a pulse every time the original moves a predetermined distance; and said checking means checks if said relative speed is within the tolerable speed by comparing the pulse signal with a first clock signal.

8. A facsimile device according to claim 5, in which said transmitting means includes an image memory for storing a fixed amount of image signal to be output from said transmitting means, and said checking means allows storage of the image signal from said image pick-up means into said image memory when the relative speed is within the tolerable speed.

* * * * *